Oct. 6, 1959 R. W. SONNENFELDT 2,907,919

RELAXATION OSCILLATING CIRCUIT ARRANGEMENT

Filed Oct. 1, 1954 2 Sheets-Sheet 1

INVENTOR.
RICHARD W. SONNENFELDT
BY
[signature]
ATTORNEY

Oct. 6, 1959 R. W. SONNENFELDT 2,907,919

RELAXATION OSCILLATING CIRCUIT ARRANGEMENT

Filed Oct. 1, 1954 2 Sheets-Sheet 2

INVENTOR.
RICHARD W. SONNENFELDT
BY
[signature]
ATTORNEY

United States Patent Office 2,907,919

Patented Oct. 6, 1959

2,907,919

RELAXATION OSCILLATING CIRCUIT ARRANGEMENT

Richard Wolfgang Sonnenfeldt, Haddonfield, N.J., assignor to Radio Corporation of America, a corporation of Delaware Application October 1, 1954, Serial No. 459,640

7 Claims. (Cl. 315—27)

The invention relates to relaxation oscillator circuits for generating non-sinusoidal waves. It particularly pertains to television receiver circuit arrangements using a single electron discharge device stage for generating electron beam deflecting waves of sufficient energy for directly deflecting or converging the deflections of the electron beams of cathode ray tubes, or kinescopes.

In present television practice images are reproduced on the fluorescent screens of cathode ray tubes or kinescopes by electron beams which are deflected horizontally and vertically to trace successive lines on the screen to form rasters and which also have the intensity varied in accordance with the light values established at the transmitter by a similar scanning operation. The electron beams may be deflected either by magnetic or by electrostatic means or by a combination of both. Deflection of electron beams is accomplished magnetically by applying sawtooth deflection current waves to the deflection system windings which are arranged about the necks of the cathode ray tubes, or kinescopes. The electron beams scan across horizontal lines of the rasters as the currents increase uniformly in the horizontal deflection system windings and successive lines of the rasters are laid down as the currents increase uniformly in the vertical deflection system windings.

The desired sawtooth waves may be generated by one of several known circuit arrangements, all of which respond to horizontal and vertical synchronizing pulses which are transmitted as a part of the composite video signal. The sawtooth waves obtainable with the prior art sawtooth wave generating circuit arrangements are essentially voltage waves and therefore lack sufficient energy for the desired magnetic deflection of the electron beam. In practice the sawtooth voltage waves thus developed are applied to one or more power amplifier tubes to produce the sawtooth current waves which are then applied to the deflection system windings, usually either through the intermediary of a deflection wave output transformer or a direct driven circuit arrangement of known form.

One of the most popularly employed sawtooth wave generating circuits utilizes the blocking oscillator. The conventional blocking oscillator is not suitable for applications involving direct connection to magnetic deflection systems because the tube is cut off between current peaks so that the tube must then furnish all the power to the circuit during a very small fraction of the total cycle. Also since the tube is either cut off or at anode saturation there can be no control of the shape or of the amplitude of the wave. These factors must be controlled in subsequent amplifying circuit arrangements as presently used in both the vertical and horizontal deflection circuit portions of conventional television receivers.

An object of the invention is to provide a non-sinusoidal current wave generator of relatively long duty cycle.

Another object is to provide an improved non-sinusoidal current wave generator having a single electron flow path device stage conducting continuously or for the greater part of each cycle.

A more specific object of the invention is to provide an improved single electron discharge tube oscillator-output circuit for use in the vertical and horizontal deflection circuit portions of otherwise conventional television receivers.

A further object of the invention is to provide an improved arrangement having but a single electron discharge device stage for driving a magnetic deflection system of a conventional television system kinescope in response to the synchronizing pulses transmitted as part of the composite video signal.

A still further object of the invention is to provide a cathode ray beam sweep oscillator having a single electron discharge device stage conducting continuously, or at least during the deflection trace time in a class A amplifier and which is cut off or saturated during the retrace time.

The objects of the invention are obtained in an oscillatory circuit arrangement including controlled electron flow path device which is substantially continuously conducting, or at least conducting during the greater part of each cycle and cut off during only a very much smaller part. Basically the circuit arrangement comprises a controlled electron flow path device having input, output, and common circuit electrodes, a transformer having a plurality of magnetically intercoupled windings, a unilateral impedance element and a charging capacitor. A terminal of one of the windings is connected to the output circuit electrode and direct energizing potential connected between the other terminal of this winding and the common circuit electrode. A terminal of another of these windings and the common circuit electrode are connected together with the windings poled in regenerative relationship. The unilateral impedance element which may be a heated cathode diode discharge device, a semi-conductor device, or the like, is connected between the other terminal of the other winding and the input electrode of the controlled electron flow path device, and a charging capacitor is connected across the input circuit of the controlled electron flow path device. The circuit arrangement is essentially an amplifier having a feedback winding coupled regeneratively into the circuit by means of the unilateral impedance element. The voltage relationships are established so that immediately after the completion of regenerative action which charges the charging capacitor, the circuit is effectively converted into an amplifier which produces a current wave proportional to the discharge of the potential across the charging capacitor. The fundamental waveform is essentially that of a sawtooth or an exponential discharging curve. Slight compensation, such as by means of a feedback network, will provide linear sawtooth current waves, or the feedback network might be arranged to produce parabolic or other cusped waves which are useful in noise immunization and pulse triggered circuits and in electron beam convergence circuits. Conceivably any other non-sinusoidal waveform may be obtained by altering the circuit constants and using feedback networks.

According to the invention the oscillatory circuit described above is synchronized with externally obtained pulses applied across a resistance element preferably connected between the common circuit electrode and the terminal of the input circuit winding remote from the input circuit electrode. Negative pulses applied across the resistance element will lower the cathode potential with respect to the potential of the input circuit electrode causing the controlled electron flow device to conduct. This conduction will be initiated at each application of the synchronizing pulses, whereby the circuit arrangement according to the invention oscillates at the recurrence frequency of the synchronizing pulses.

In order that the practical aspects of the invention may be more fully appreciated, several specific embodiments thereof, given by way of example only, are described below with reference to the accompanying drawing forming a part of the specification and in which.

Figure 1:
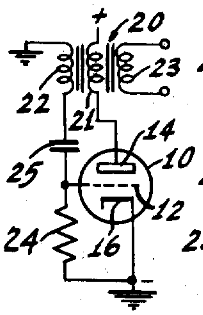
Fig. 1 is a schematic diagram of conventional blocking oscillator.
Figure 2:
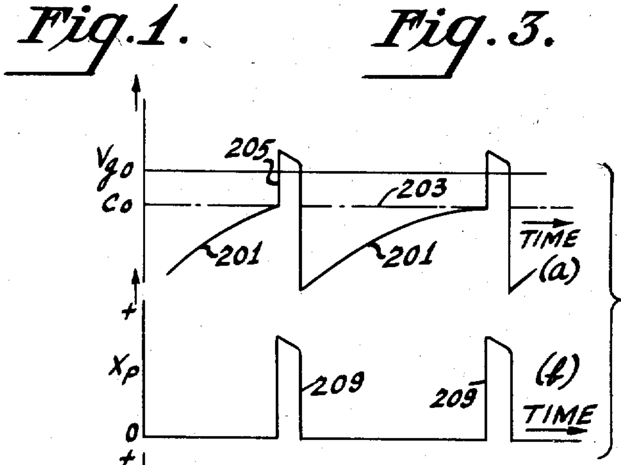
Fig. 2 is a graphical representation of waveforms obtained with the conventional blocking oscillator shown in Fig. 1.

The circuit arrangement shown in Fig. 1 is that of the conventional blocking oscillator, the output waveforms of which are shown in Fig. 2. The blocking oscillator comprises a controlled electron flow path device shown here as an electron discharge device 10 having an input circuit and an output circuit defined by input, output and common circuit electrodes in the form of a control grid electrode 12, an anode electrode 14 and a cathode electrode 16 respectively. A transformer 20 comprising a plurality of windings 21—23 magnetically intercoupled, a grid resistor 24 and a capacitor 25 are connected as shown in the drawing. Direct energizing potential is applied between the cathode electrode 16 and one terminal of the output circuit winding 21, the other terminal of which is connected to the anode electrode 14.

The curve in Fig. 2(*a*) shows the potential at the control grid electrode 12. The curve portions 201 represent the discharge curve of the capacitor 25 which is negatively charged once each cycle and is arranged to discharge across the grid resistor 24 until a potential equal to the cut-off voltage of the discharge device 10, as represented by the line 203, is reached at which time the grid voltage rises sharply as indicated by the line 205 causing the discharge device 10 to act as a regenerative amplifier which is saturated as soon as the voltage on the control grid electrode 12 begins to go positive. During the time represented by the projection of the curve 201 on the horizontal axis the discharge device 10 is blocked and no anode current flows. Only during the time in which the grid potential exceeds the cut-off voltage does anode current flow, as is presented by the pulses 209 in Fig. 2(*b*). From the curves of Fig. 2, it is seen that the conventional blocking oscillator is not suitable for direct application to the deflection system of a kinescope because the pulses 209 must be integrated in order to provide the sawtooth current wave required by the deflection system.

Figure 3:
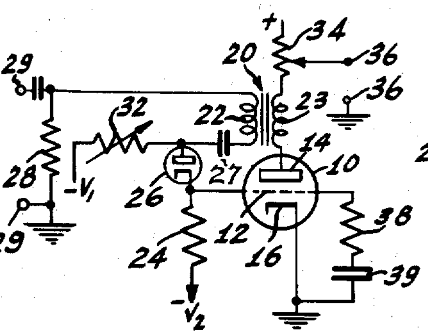
Fig. 3 is a schematic diagram of one embodiment of an oscillatory circuit arrangement according to the invention.

Referring to Fig. 3 there is shown an oscillatory circuit arrangement according to the invention for producing a sawtooth output wave suitable for direct application to the deflection system of a cathode ray tube, or kinescope. The oscillatory circuit comprises a controlled electron flow path device shown here as an electron discharge device 10 having an input circuit and an output circuit defined by input, output and common circuit electrodes in the form of a control grid electrode 12, an anode electrode 14 and a cathode electrode 16, respectively. A transformer 20 comprising a plurality of windings 21—23 magnetically intercoupled, a unilateral impedance element 26 and a charging capacitor 39 complete the essentials of the oscillatory circuit of the invention.

One terminal of the input circuit winding 22 is connected by means of the unilateral impedance element 26 and a blocking capacitor 27 to the input or control electrode 12 and the other terminal is connected to a point of fixed reference potential, shown as ground, either essentially directly for a free running oscillator or through the intermediary of a resistance element 28 across which a train of synchronizing pulses may be applied at the synchronizing pulse input terminals 29. Direct energizing potential is applied between the cathode electrode 16 and one terminal of a variably tapped resistor 34 connected by the output circuit winding 21 to the anode electrode 14. The windings 21 and 22 are poled in regenerative relationship. The grid resistor 24 is connected between the control electrode 12 and a source of potential negative with respect to the potential of the cathode electrode 16. The junction between the anode electrode of the unilateral impedance element 26 and the coupling capacitor 27 is rendered, by means of a variable resistance device 32, negative with respect to the potential on the cathode electrode 16 by connection to a source of potential which may be a different source or may be the same source, as desired. The only essential feature is that different potentials be available for application to the diode electrodes of the unilateral impedance device 26. A resistor 38 and a charging capacitor 39 are connected in series between the control grid electrode 12 and the cathode electrode 16.

Since the windings 21 and 22 are connected in regenerative relationship, at some time there tends to be a highly damped sine wave across the winding 22. The positive peak of this sine wave will cause current to flow through the diode element 26 and the control grid-cathode electrode circuit of the electron discharge device 10. This current will charge the coupling capacitor 27 and the charging capacitor 39. When the pulse disappears, the diode element 26 effectively disconnects the input circuit of the electron discharge device 10 from the transformer 20 due to the charges on the coupling capacitor 27 and the charging capacitor 39. The electron discharge device 10, however, is not cut off but has applied to the control grid electrode 12 a voltage proportional to voltage across the charging capacitor 39; the proportion being fixed by the ratio of resistances of the grid resistor 24 and of the series resistor 38. The voltage across the charging capacitor 39 will decay exponentially to a voltage equal to $-V_2$ with a time constant equal to $C_{39}(R_{24}+R_{38})$. Similarly the voltage across the coupling capacitor 27 will decay exponentially to a value $-V_1$ with a time constant $C_{27}R_{32}$. When the capacitors have discharged to such an extent that the voltage across the unilateral impedance element 26 is zero, the transformer 20 is effectively reconnected to the electron discharge device 10 and the cycle is repeated. The tube bias is varied to obtain operation about any desired point on the tube characteristics curve of the unilateral impedance element 26 to obtain the desired linearity of waveform. The frequency is adjusted by varying the value of resistor 32.

As in the more conventional oscillators the output waveform may be taken at various points of the circuit arrangement described, but it is suggested that the utilization device be connected between the load terminal 36 and ground.

The circuit arrangement in Fig. 3 develops a sawtooth anode current wave and no integration is needed in the anode circuit to form the sawtooth wave. Therefore the windings of a cathode ray tube deflection system or a deflection winding coupling transformer may be connected into the anode circuit for magnetic deflection of the electron beam.

A graphical representation of the potentials occurring in the circuit arrangement of Fig. 3 are shown in Fig.

Figure 4:
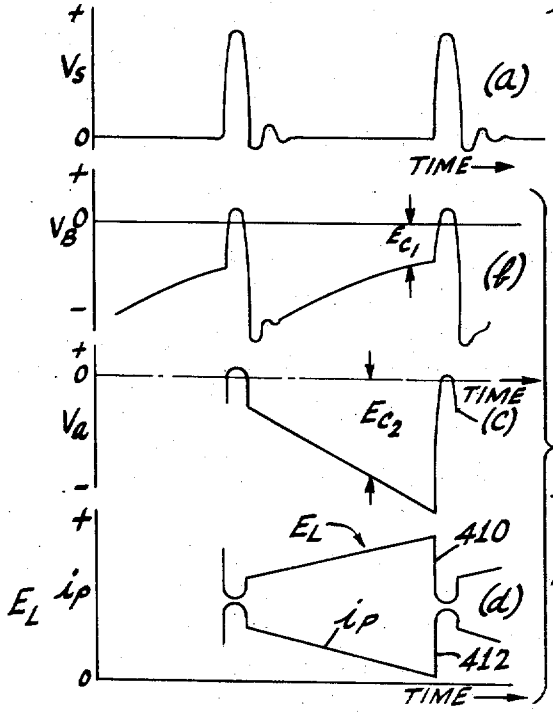
Fig. 4 is a graphical representation of the operating waveforms obtained in a circuit arrangement according to the invention.

4. The curve in Fig. 4(*a*) represents the potential across the input circuit winding 22, while the curve in Fig. 4(*b*) represents the potential across the coupling capacitor 27 and the curve in Fig. 4(*c*) represents the potential across the charging capacitor 39. Fig. 4(*d*) shows the relationship between the potential across the resistor 34 as represented by the curve 410 and the current through this resistor as represented by the curve 412.

Figure 5:
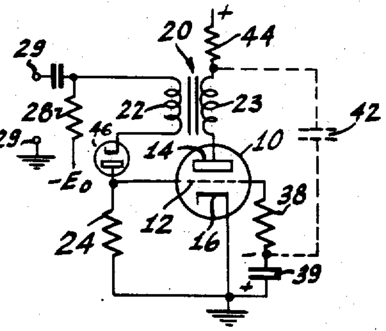
Fig. 5 is a schematic diagram of another embodiment of the invention.

In Fig. 5 there is shown a simpler circuit arrangement according to the invention wherein a diode unilateral impedance element 46 is inverted with respect to the connection shown in Fig. 3 and a single source of negative potential is connected to the outer terminal of the input circuit winding 22. The circuit arrangement of Fig. 5 is put into operation by applying the energizing potential which causes a fluctuation tending to increase the flow of anode current through the electron discharge device 10. This will induce the potential across the input circuit winding 22 because of the regenerative connection of the transformer 20. If the charging capacitor 39 is initially discharged the diode element 46 will be cut off, disconnecting the electron discharge device 10 from the transformer 20 and the action will cease causing a fluctuation tending to decrease the anode current. Then the potential across the input circuit winding 22 will decrease and the anode current will decrease further because the diode element 46 is now conducting. A large negative pulse will be developed and the electron discharge device 10 will then be cut off, which will interrupt the regenerative action. The charging capacitor 39 will be charged and the diode element 46 will be cut off as soon as the pulse passes, disconnecting the electron discharge device 10 from the transformer 20. The control electrode 12 of the electron discharge device 10 will then see that portion of the exponentially decreasing voltage across the charging capacitor 39. This voltage is developed across the grid resistor 24 and the discharge device will amplify this curve across the load resistor 44 in the anode circuit. When the voltage across the grid resistor 24 becomes equal to $-E_c$, the diode element 46 will conduct again and the cycle will be repeated. The output anode current wave of the circuit as thus far described may be rendered more nearly linear by applying feedback as shown for example by the broken line and the feedback capacitor 42. The diode element 46 effectively short circuits the feedback voltage to ground when it conducts during the short regenerative interval.

Figure 6:
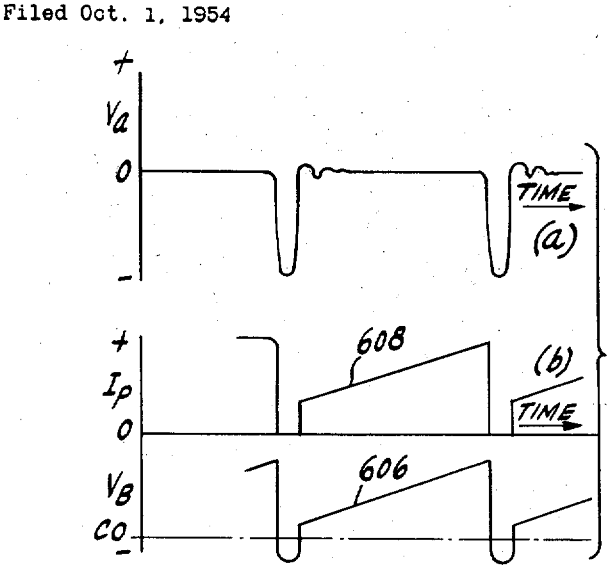
Fig. 6 is a graphical representation of waveforms appearing at various points in the circuit arrangement shown in Fig. 5.

The voltage pulses across the input circuit winding 22 in the circuit arrangement of Fig. 5 are shown by the curve of Fig. 6(*a*), while the grid voltage variation is shown by curve 606 of Fig. 6(*b*) and the anode current is shown by curve 608 of the same figure. The controlled electron flow path device 10 or electron discharge device 10 is conducting, for the greater part at least, of each cycle which permits control of the amplitude and linearity of the output wave during this large part of the cycle.

Figure 7:
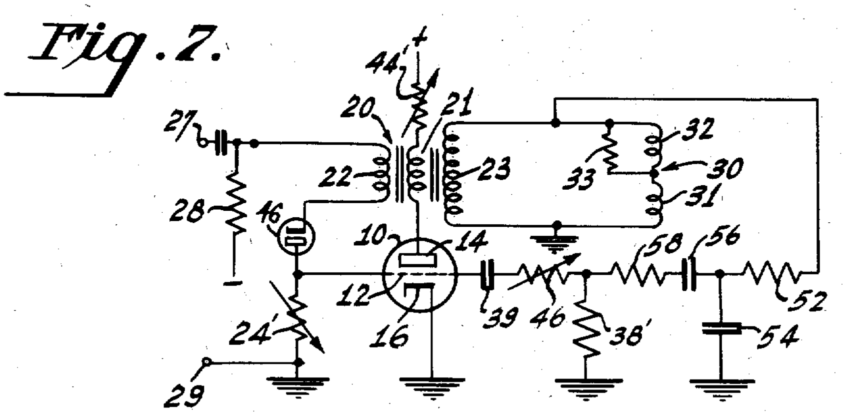
Fig. 7 is a schematic diagram of another embodiment of the invention incorporating a feedback network.

Referring to Fig. 7 there is shown a circuit arrangement of an oscillator according to the invention which is similar to that shown in Fig. 5 but adapted specifically for use in a conventional television receiver as a horizontal deflection wave generating and deflection system driving circuit. In this arrangement the grid resistor 24' is made variable to serve as a frequency or hold control and the charging capacitor 39 is connected to the variable resistor 46, which serves as a linearity control, and a fixed resistor 38' which serves the same purpose as the resistor 28 in Fig. 3. A variable resistor 44' is in the anode load circuit to serve as the height or vertical size control. The load element which in this case is formed by the low impedance windings 31, 32 of a cathode ray deflection system are coupled to the stepdown load winding 23 of the transformer 20.

In many applications of a circuit arrangement according to the invention it is desirable, if not necessary as well, that the circuit arrangement be synchronized with some external wave. In present television practice it is desirable to synchronize the horizontal and vertical deflection wave generating circuits with horizontal and vertical pulses. The circuit arrangements of Figs. 3, 5 and 7 according to the invention are readily synchronized by interposing the resistance element 28 between the cathode electrode and of the input circuit winding 22 and the cathode electrode 16. A train of negative synchronizing pulses is applied across the resistance element 28 to cause the tube to conduct at the leading edge of each of the pulses to initiate a cycle. As in the conventional synchronized oscillators the constants of the circuit arrangements are chosen so that the free frequency is slightly lower than the pulse recurrence, or forced, frequency whereby the synchronizing pulses definitely initiate each cycle of oscillation.

It is an advantage of the circuit arrangement shown in Figs. 3, 5 and 7 that a sawtooth wave of current of sufficient linearity for driving the deflection system of an image reproducing device, or kinescope, within good tolerance is directly obtained. There are times, however, when better linearity or slightly different current wave shapes are desired. By feeding an integrated sample of the output current to the input circuit control electrode or perhaps to the suppressor grid of a pentode tube and like arrangements, waves of different form may be obtained. For example, the circuit arrangements according to the invention may be readily modified as shown in Fig. 7, with a feedback network to deliver a more linear sawtooth wave, or a parabolic waveform which is extremely useful in color television sets of the electron beam deflection to insure convergence of the three color beams on all parts of the fluorescent screen of the color reproducing kinescope. The feedback network is connected between one side of the load winding 23 and the junction between the linearity control 47 and the resistor 38'. The feedback network comprises a series resistor 52, a shunt capacitor 54, and series capacitor 56 and resistor 58, all of which have values chosen to provide the desired linearity of output wave. In this circuit arrangement the electron discharge device 10 never draws grid current, does not draw a high peak anode current, and is cut off for only very short intervals all of which features prolong the tube life and the reliability of circuit operation.

In an embodiment of the invention constructed along the lines shown in Fig. 7 the following component parts values provided excellent linear sawtooth waves.

| Ref. No. | Component | Type or Value |
|---|---|---|
| 10 | Oscillator tube | 6S4. |
| 20 | Transformer | 4:1 ratio between windings 21 and 22. |
| 24' | Frequency control | 0–2 Megohms. |
| 26 | Diode element | 1/2 6AL5. |
| 28 | Resistance element | 1,200 ohms. |
| 31, 32 | Deflection windings | 50 ohms. |
| 38' | Deflection resistor | 22 kilohms. |
| 39 | Charging capacitor | 0.02 mf. |
| 44 | Amplitude control | 0–10 kilohms. |
| 46 | Diode element | 1/2 6A25. |
| 47 | Linearity control | 0–120 kilohms. |
| 52 | Feedback resistor | 68 kilohms. |
| 54, 56 | Feedback capacitors | 0.01 mf. |
| 58 | Feedback resistor | 100 kilohms. |

Obviously other values will be found suitable by those skilled in the art in adapting the invention to other applications.

The invention claimed is:

1. In a wave generating system capable of developing a sawtooth current waveform, the combination of: an electrical amplifier device having input terminal means and output terminal means, said input terminal means being responsive to predetermined values of bias to establish the portion of the transfer characteristic between said input terminal means and output terminal means over which said amplifier device is caused to operate for a given amplitude of signal input applied to said input terminal means; means coupled with said input terminal means for defining an input circuit to said amplifier device; means coupled with said output terminal means for defining an output circuit for said amplifier device; inductance means connected in said input circuit; means regeneratively coupling said output circuit to said inductance means to conditionally establish regeneration in said amplifier device; a first time constant means connected in shunt with said input terminal means; a voltage responsive switch means connected in said input circuit in series with said inductor and in charging relation to said time constant means, the extent of said regenerative feedback and the value of said time constant means being such to conditionally close said switch means to provide regeneration in said amplifier for a relatively short interval of time followed by a longer interval of time during which the charge on said time constant circuit establishes non-regenerative operation of said amplifier over a linear portion of its transfer characteristic.

2. In an electrical circuit, the combination of: an amplifier device having output terminal means and input terminal means, said amplifier device being capable of establishing a signal gain between said input terminal means and said output terminal means; means coupled with said input terminal means for establishing an input circuit; means coupled with said output terminal means for establishing an output circuit; means coupled with both said input circuit and output circuit for establishing regeneration between said output circuit and said input circuit; signal responsive means including a unilateral conducting device connected in said input circuit and responsive to signals developed therein for controlling said regeneration; time and constant means connected in said input circuit and in charging relation to signals appearing therein and in controlling relation to said signal responsive means for controlling regeneration in said amplifier in accordance with the charge developed across said time constant means, said signal responsive and time constant means providing regenerative operation of said amplifier device during a first portion of the operating cycle and linear amplifier operation during the remaining portion of the operating cycle.

3. In a blocking oscillator type waveform generator, the combination of: an electrical amplifier device having an input circuit terminal means and an output circuit terminal means; means connected with said input terminal means for establishing an input circuit; means connected with said output terminal means for establishing an output circuit; a feedback transformer having at least a primary and a secondary winding; a diode connected in series with said secondary winding to form a combination; means connecting said combination in series with said input circuit; means connecting said primary winding in series with said output circuit with such polarity as to establish a regenerative relationship between energy coupled by said feedback transformer from said output circuit to said input circuit; time constant means connected in said input circuit in chargeable relation to currents conditionally conducted by said diode and in potential determining relation to said input terminal means so that the charge appearing across said time constant means is in driving relation to said amplifier device; and means connected with said input circuit for controlling the bias appearing across said diode for conditionally permitting said diode to establish regeneration in said amplifier device during the first portion of an oscillatory cycle and permitting the electrical waveform representing discharge of said time constant circuit to be linearly amplified by said amplifier device during the second portion of said oscillatory cycle.

4. In a blocking oscillator type waveform generator, the combination of: an electrical amplifier device having an input circuit terminal means and an output circuit terminal means; means connected with said input terminal means for establishing an input circuit; means connected with said output terminal means for establishing an output circuit; a feedback transformer having at least a primary and a secondary winding; a diode connected in series with said secondary winding to form a combination; means connecting said combination in series with said input circuit; means connecting said primary winding in series with said output circuit with such polarity as to establish a regenerative relationship between energy coupled by said feedback transformer from said output circuit to said input circuit in time constant means connected in said input circuit in chargeable relation to currents conditionally conducted by said diode and in potential determining relation to said input terminal means so that the charge appearing across certain time constant means is in driving relation to said amplifier device; means connected with said input circuit for controlling the bias appearing across said diode for conditionally permitting said diode to establish regeneration in said amplifier device during the first portion of an oscillatory cycle and permitting the electrical waveform representing discharge of said time constant circuit to be linearly amplified by said amplifier device during the second portion of said oscillatory cycle; and negative feedback means connected between said input circuit and output circuit and in such relation to said diode as to effectively disable said negative feedback means during conduction of said diode and enable said negative feedback means during non-conduction of said diode.

5. In a deflection waveform generation system for driving an electromagnetic deflection yoke associated with a deflectable cathode ray beam, the combination of: an amplifier device having an input circuit and an output circuit regeneratively connected to one another so as to establish regeneration in said amplifier device; a diode connected in said input circuit and in controlling relation to said regeneration, the connection of said diode being such as to enable said regeneration conditionally upon conduction in said diode and disable said regeneration upon non-conduction in said diode; bias means connected in said input circuit and in controlling relation to said diode for permitting conduction through said diode to establish regenerative feedback between said input and output circuits for a first portion of a deflection waveform cycle; and time constant means connected in charging relation to said diode for establishing non-conduction in said diode and disablement of said regeneration during the remaining portion of said deflection waveform cycle, during which remaining portion changes in the charge condition of said time constant means act as a signal drive to said amplifier device, and means coupled to said amplifier output circuit for coupling current changes therein to an electromagnetic deflection yoke.

6. In a waveform generating system for developing a periodically recurrent waveform, the combination of: an amplifier having input terminal means and output terminal means between which is established a signal gain, the direct current potential appearing across said input terminal means being determinative of the mode of amplifier operation as either that of a substantially linear type amplifier or that of a substantially non-linear type amplifier; means coupled between said input circuit terminal means and output circuit terminal means for establishing a controllable regenerative operation of said amplifier device on a non-linear amplification basis; a unilateral conduction device connected between said means establishing said feedback and said input terminal means for controlling regeneration in said amplifier device as a function of conduction in said unilateral conduction device; means including a first source of bias potential connected with one extremity of said unilateral conduction device; time constant means connected in charging relation with respect to said unilateral conduction device, in biasing relation thereto, and substantially in shunt with said input terminal means so that the charge developed across said time constant means acts during one portion of a waveform cycle to disable said feedback and so bias said diode and amplifier to establish substantially linear amplification in said amplifier device while during another portion of said waveform cycle permitting said non-linear regenerative operation during the remaining portion of said waveform cycle.

7. A free running oscillator circuit for providing a waveshape of sawtooth form comprising, in combination, an amplifying device having a first, a second, and a third electrode, said first and second electrodes defining an output circuit, said second and third electrodes defining an input circuit, a transformer having a primary and a secondary winding, means connecting said primary winding with said first electrode, means providing a feedback circuit between said output and input circuits to provide regenerative feedback and charging of said storage means during a first portion of the operating cycle of said oscillator and linear amplifier operation of said amplifying device during a second portion of the operating cycle of said oscillator, said last named means including a unilateral conducting device connected between said secondary winding and said third electrode, charge storage means connected with said third electrode and responsive to current flow of said amplifying device to develop a charge of a polarity to reverse bias said unilateral conducting device during said second portion of the operating cycle of said oscillator, said unilateral conducting device being conductive during said first portion of the operating cycle and nonconductive during the second portion, and means for deriving said waveshape of sawtooth form from said first electrode.

References Cited in the file of this patent

UNITED STATES PATENTS

| | | |
|---|---|---|
| 2,241,762 | Blumlein | May 13, 1941 |
| 2,277,000 | Bingley | Mar. 17, 1942 |
| 2,556,027 | Carson | June 5, 1951 |
| 2,573,284 | Shaw | Oct. 30, 1951 |
| 2,586,310 | Dill | Feb. 19, 1952 |
| 2,743,907 | Christensen | May 1, 1956 |

OTHER REFERENCES

"Waveforms," by Chance et al., Radiation Laboratory Series, vol. 19, McGraw-Hill; pages 221, 222, 343–345.